Dec. 27, 1966     W. C. HARDY ETAL     3,294,164
SECONDARY RECOVERY OF PETROLEUM WITH
A PREFORMED EMULSION SLUG DRIVE
Filed Aug. 12, 1963
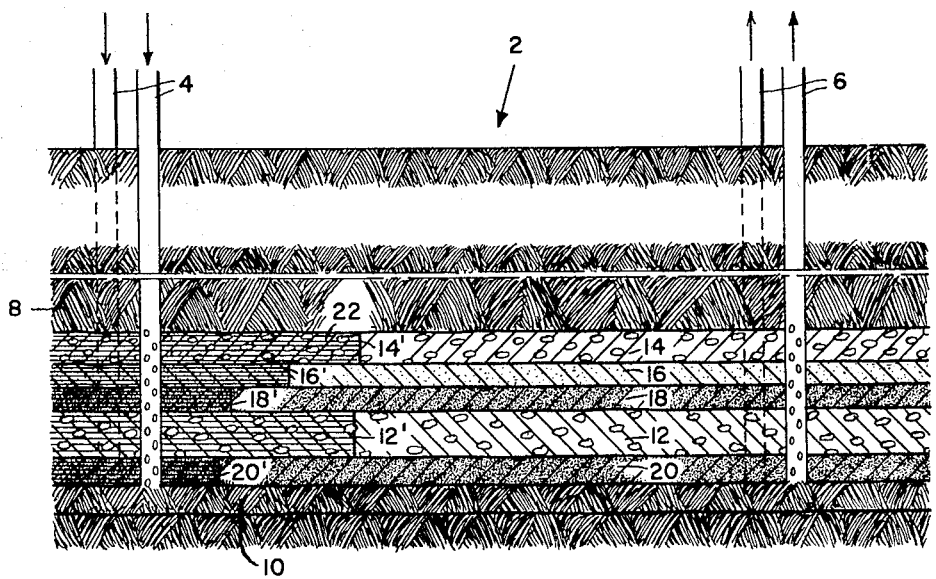
INVENTORS
WILLIAM C. HARDY &
JOHN C. SHEPARD
KEITH L. REDDICK
BY
ATTORNEYS

3,294,164
SECONDARY RECOVERY OF PETROLEUM WITH A PREFORMED EMULSION SLUG DRIVE
William C. Hardy and John C. Shepard, Richardson, and Keith L. Reddick, Dallas, Tex., assignors to Sun Oil Company, Philadelphia, Pa., a corporation of New Jersey
Filed Aug. 12, 1963, Ser. No. 301,300
1 Claim. (Cl. 166—10)

This invention relates to the secondary recovery of petroleum and has particular reference to improving the drive of oil-containing fluid located in heterogeneous formations.

So-called secondary recovery methods involve the drive of the oil-containing fluid (hereafter referred to as the driven fluid and containing petroleum oil and/or water and/or gases) from the reservoir rock into producing wells by driving fluids such as water or gas which are injected into the reservoir through injection wells, both types of wells being properly located within its extent. Many variations of such methods are known, sometimes involving the provision of slugs of various fluids between the driven fluid and the driving fluid.

The effectiveness of oil recovery by such methods depends upon many factors, but one which is quite important is the degree of heterogeneity of the reservoir rock. The heterogeneity of significance in connection with the present invention is that which may be most generally stated as involving stratifications or lamination of the rock in the direction in which flow is desired, with the stratification involving layers varying quite considerably in permeability. The problem which is presented by this situation is easily evident: a layer of high permeability will offer low hydraulic resistance to flow of both the driven and the injected driving fluid, while a layer of low permeability will offer a high resistance to flow. If layers of these various types all contain oil, as is usual, the advance of material through the high permeability layers will be much greater than through the low permeability layers, resulting in premature breakthrough and arrival of injected fluid at the production wells. Once this occurs, further flow of driving fluid will ordinarily take place substantially only through the higher permeability layers, bypassing the low permeability layers which may well have had their oil content driven only to a relatively small extent.

The condition detrimental to production which has just been outlined has been recognized in the art, and attempts have been made to shut off or plug the high permeability layers at either or both of the injection and producing wells. It can be readily seen that such a procedure is, at best, only effective to a quite limited degree. While stratification usually produces a condition of higher permeability in directions parallel to the stratification as compared with directions transverse thereto, the vast extent of area existing in a usual oil reservoir provides "leakage" of flow from low permeability layers to adjacent high permeability layers through their interfaces, so that, in effect, while streamlines of flow may start out from an injection well along a low permeability layer (adjacent high permeability layers being blocked off) they will gradually deviate through boundaries into higher permeability layers and proceed, preferentially, therealong, with the result that again the flow which takes place will be largely through the layers of higher permeability, with little or no flow through major regions of the low permeability layers.

In accordance with the present invention the adverse conditions are rectified by the provision in the vicinity of one or more injection wells of a viscous mobile slug which will form a boundary between the driven fluid and the driving fluid. As will appear hereafter, this slug will have greater extent in the direction of flow within the more permeable layers than in the less permeable layers. The viscosity of the slug offers frictional resistance to flow, to overcome which a substantial pressure gradient is necessary. The resistance offered is an increasing function with the extent of the slug in the direction of flow. Once the slug is set up, therefore, a given pressure gradient between the injection wells and the production wells will result in a more nearly equal rate of displacement in the layers of different permeabilities. Thus a more uniform sweep of all of the permeable layers is produced, resulting in a higher overall removal of the desired oil from the reservoir.

The objects of the invention have to do with the effective drive of petroleum from layers of different permeabilities, and these will become more evident from consideration of the following description of the process with reference to the accompanying drawing in which the figure is a highly conventionalized diagram of a vertical section of an oil reservoir taken between injection and production wells.

The reservoir is generally indicated at 2. A plurality of injection wells are indicated at 4, and a plurality of production wells at 6. As is usual, multiple wells are thus provided strategically located in accordance with knowledge of the reservoir dimensions and characteristics in order to provide most effective removal of oil. While, as will be evident to those skilled in the art, the reservoir may be of any one of many types, it may be assumed for simplicity in describing the invention that a layer 8 of relatively impervious rock overlies the strata which bear oil. It may also be assumed that the oil-bearing strata are located above another relatively impervious rock layer 10. Between these boundaries, there are, frequently, fairly well defined layers which may differ very considerably in permeability in the direction from the injection wells to the producing wells. These layers may, of course, slope or have various curvatures, but, commonly they lie generally parallel to each other, and are conventionalized in the figure as extending generally horizontally. Some of the layers may be discontinuous; i.e., they may terminate or begin at various locations as viewed in the direction of flow.

Of the layers illustrated, those at 12 and 14 may be considered layers of relatively high permeability in the direction of their extent; layer 16 may be considered as of intermediate permeability; and layers 18 and 20 may be considered as having relatively low permeability. All of these layers will generally contain oil, possibly together with water and gas, and the desired result is that of driving their fluid contents from the location of the injection wells towards the producing wells. Considering the figure to the extent so far described, there may be readily visualized what would occur in accordance with conventional practices uitilizing water or gas as the injected fluid, or utilizing additionally between the driving and driven fluids conventional slugs such as those of the so-called "miscible" type. Flow would occur so preferentially in the layers such as 12 and 14 that rapid displacement would occur therein as compared with such layers as 18 and 20. Thus these layers 12 and 14 of high permeability would be swept out and the driving fluid would reach through them the production wells long before even partial sweep through the low permeability layers would occur. Once a breakthrough of the driving fluid to the producing wells occurred, the effectiveness of the recovery process would be severely impaired. The remaining oil in the low permeability layers would then be recoverable less profitably or economically.

In accordance with the present invention, a viscous slug, of a type hereafter more fully described, is produced from slug-forming fluid materials introduced under pressure through the injection wells 4. This slug, shown in the condition following its formation, is indicated by the horizontally shaded region designated 22.

First, let it be assumed, that the slug-forming fluid materials are introduced through the injection wells without the exercise of special control, the fluid flowing into the strata through conventional perforations in the casings of the wells. As this fluid enters the various layers, it will obviously meet with less resistance to flow in the high permeability layers with the result that, as injection proceeds, it will, at any time, radiate substantially further from the injection wells in the more permeable strata as compared with the less permeable strata. Ultimately, the viscous slug will inundate a region around the injection wells reaching, in the respective layers, the varying boundaries shown at 12', 14', 16', 18' and 20'. At the end of the slug formation procedure, it is generally desirable to have the slug volume of the order of 0.5% to 10% of the volume of oil-bearing fluid which is estimated to be in place in the reservoir. This quantity, however, is subject to extreme variation depending upon the nature of the formations as determined by coring in the drilling of the various wells in the reservoir and from data derived as the result of primary production. All of the physical characteristics of the reservoir, including dimensions, must be taken into account to ascertain the proper amount of material to be injected. From such knowledge good estimates of what should be done may be made considering the theoretical aspects of what is to occur as will now be described.

Following the injection of the materials, there will exist a slug separating the driving fluid from the driven fluid throughout the cross-section of the flow pattern, and this slug will accordingly be hereafter referred to as a viscous slug, since it will have an effective viscosity exceeding that of both the driving and driven fluids.

The driving fluid is now introduced under pressure and at the desired rate or rates through the injection wells.

Consider, now, the pressure conditions which will exist. Assume that the pressures at the injection wells are the same, though this, of course, need not be the case since deductions from the known existing conditions may indicate that the pressures should differ. Also assume, for simplicity, that the pressures existing at the producing wells are the same.

Consider, now, the conditions existing in a high permeability layer such as 12. As already indicated, the viscous slug will extend to a greater extent in the direction of flow in this layer as compared with layers of lower permeability, this being the result merely of injection of the slug-forming materials. The overall pressure gradient between the injection wells and the producing wells in this layer 12 will be made up of gradients comprising, first, that across the unswept region of this layer between the boundary 12' and the producing wells, and, secondly, that between the injection wells and the boundary 12'. The former of these gradients will depend upon the velocity (volumetric) of displacement, the extent of its region in the direction of flow, the viscosity of the fluid in the unswept region, and the permeability of the layer 12. In the case of the portion of the slug in this same layer, the gradient between the injection wells and the boundary 12' is similarly dependent upon such matters, the velocity (volumetric) being the same and the permeability of the layer 12 being the same, but the viscosity of the slug material and the extent in the direction of flow being different. Since the velocity of flow at any point is a function of the pressure gradient, it will be evident that, as the slug has a greater extent in the direction of flow, the resulting pressure gradient moving the in situ fluid will be less so that for a given overall gradient the production rate through the well 6 from this layer will be less.

Consider next the low permeability layer such as 20.

The viscosity of the in situ fluid is here the same as in the layer 12, but the permeability is less. The viscosity of the slug material in this layer is also the same as that of the same material in the more permeable layer. But because of the less horizontal extent of the slug material, the pressure drop tending to move the in situ fluid through the layer 20 may be much greater than in the more permeable layer.

Remembering that the initial penetration of the slug-forming material as it was put in place was dependent upon similar pressure and volumetric velocity aspects, it will be evident that an automatic adjustment will have occurred to the end that, to a fair approximation, when driving fluid is now injected the volumetric displacement velocities in the various layers are more or less equalized, to the end that the slug will travel substantially as a unit, more or less maintaining its volumes in the respective layers, and driving the in situ fluid ahead of it toward the production wells much as if a rigid piston was operating through all of the layers simultaneously. Thus a more uniform sweep of the permeable layers occurs, with much improved condition of uniformity of removal of the desired fluid.

It may also be noted that the situation is to a considerable extent self-adjusting. Suppose, for example, that somehow the slug in the layer 20 was initially, or became later, too extended in the direction of flow so as to offer so much resistance that displacement of the fluid in the layer 20 lagged behind that in the layer 12. The slug material in the latter layer would then advance more rapidly, tending to outdistance the slug in the layer 20. But as soon as this occurred, the "leakage" between layers would take place, and the viscous slug material would pass into the layer 12 following the slug material of the latter, so that the slug material in the layer 20 would be decreased in volume, with the resulting offering by it of less resistance to flow, with an accompanying increase of rate of displacement in the layer 20. In effect, therefore, the "piston" provided by the viscous slug is more or less automatically adjusted in its configuration, always in a sense to tend to maintain equalization of displacement rates in the various layers. This automatic readjustment will also occur if the layers vary in relative thicknesses.

What has been described is obviously rather conventionalized for simplicity of consideration. Displacements and displacement rates have been treated as if they occurred essentially only along lines between the injection and producing wells. Obviously, the flow conditions are two-dimensional in the layers and the boundaries are not well-defined, though definition is usually reasonably sharp. But it will be evident, without further elaboration, that what has been described is more generally true for this two-dimensional type of flow. The boundaries between the slug and the driven fluid, and between the slug and the driving fluid, though curved, and varying with the progress of the drive, will, generally, conform to the desired conditions in which the slug as a whole, varying in its shape, will act essentially as a piston to drive the driven fluid uniformly through the various layers. As viewed from above the slug would appear as an annulus having rather irregular boundaries expanding outwardly with the drive and bulging towards the production wells, i.e. in the direction of freer flow. With its outward expansion its width would decrease, maintaining, however, substantial equalization of flows in the various layers by the actions already described.

In the foregoing discussion it was pointed out that generally the varying permeabilities of the layers would result in the introduction of slug-forming materials variably thereto in conformity with what is desired, even though no control of introduction of the slug-forming materials at various levels was effected. However, where observed conditions would seem to warrant, the slug-forming materials may be differentially injected into various layers by the use of packers in fashions well known in this art for injection of fluids where desired. By the use of packers, injection of the fluid or fluids may be cut off from the less permeable layers for selective major introduction into the more permeable layers, and proportioning of the amount of fluid or fluids introduced into the layers may be thus controlled. The initial volumetric shape of the slug may thereby be made whatever seems desirable to the operator. In a highly permeable layer, for example, it may be desirable to introduce a much greater amount of the slug-forming materials than would proportionately go thereinto merely by uncontrolled injection into all of the layers.

The nature of the viscous slug material provided in accordance with this invention may vary considerably in both its composition and mode of formation, but is essentially an emulsified slug with oil and water constituents.

It is known that the oxidation of petroleum crude oils will result in the formation of products giving rise to reduced interfacial tension with water so that stable water-oil emulsions may be formed. Reaction with oxygen, produced by treatment with air, will effect change of various hydrocarbon compounds of the crude oil, such as unsaturates, asphaltic materials and certain naphthenic compounds, to oxygenated compounds such as alcohols, aldehydes, ketones and organic acids, carbon dioxide and water being produced. The presence of these reaction products in a water-oil mixture reduces the water-oil interfacial tension promoting the formation of emulsions for example, some typical results are the following:

A paraffin base oil oxidized under controlled conditions (avoidance of complete composition) reduces the interfacial tension from 24.6 dyne centimeters to 15.4 dyne centimeters. A sample of an intermediate crude involved a reduction of interfacial tension from 26.5 dyne centimeters to 17.4 dyne centimeters. In the case of a naphthenic base crude the reduction was from 24.0 dyne centimeters to 4.5 dyne centimeters. All of the foregoing products readily produced stable emulsion with water upon agitation.

The oxidation procedure may vary widely depending upon the results desired. In general it involves intimate treatment of the crude oil with air preferably at an elevated temperature which primarily has the effect of increasing the rapidity of oxidation, since oxidation may be carried out at ordinary temperatures though it then proceeds slowly. The treatment with air desirably should be under conditions to avoid waste of the oil by oxidation (burning) which would merely produce too great amounts of the undesired carbon dioxide and water. To avoid this latter condition, rise of temperature is desirably controlled and the introduced air is held below the amount which would effect combustion. The reaction is exothermic but may be readily controlled by holding down the rate of admission of air.

In accordance with the present invention, the procedure may be carried out in two fashions which may be distinguished by the fact that in one instance the oxidation may be effected in surface equipment while in the other instance the oxidation may be effected by treating reservoir oil in situ. A combination of these two procedures may be used when reservoir conditions indicate its desirability.

Referring to the first procedure crude oil previously obtained from the reservoir or elsewhere may be oxidized in surface equipment of known type in which intimate contact of air and crude oil is effected by counter current flow through a bubble cap tower under conditions controlled as above indicated to produce an oxidized product suitable for emulsion formation. This product may then be mixed with water under the usual conditions of violent agitation and intimate contact to produce an emulsion which may then be introduced into the formation through one or more injection wells to give rise to the desired slug.

In the alternative procedure, and particularly if the residual oil in the reservoir is of a type which by oxidation will give an oxidized product suitable for emulsion formation, air may be forced into the formation through one or more injection wells. To provide the necessary heat for acceleration of the oxidation, fuel such as natural gas or additional crude oil may be burned. The air is introduced in considerable excess to promote oxidation, burning being effected in the well with extension of the burning into the formation. However, conditions may be adopted in which the air is used to burn the oil in situ in the vicinity of the injection well or wells. The procedure in the latter case is similar to the well known procedure used in so-called forward burning; i.e., local burning at or near the point of injection will actually substantially fully oxidize some of the oil in situ, and the heat together with the excess oxygen provided by the air will then effect the controlled oxidation downstream. In this latter case, some emulsion may be produced at the time of oxidation by reason of the presence of water in the formation and by reason of condensation of water produced by the burning and partial oxidation.

However, in the last mentioned procedure, it is estimated that insufficient oxidation products will be produced to provide the material and a complete desired slug, oxidized oil as first mentioned may be added to augment the oxidized materials produced in situ.

In the light of the foregoing several different procedures may be adopted to build up the emulsion slug.

If the emulsion is produced completely at the surface and pumped into the formation through the injection well or wells, this emulsion, desirably introduced in a volumetric amount estimated to be less than 10% of the oil in place in the reservoir may be either controlled selectively to the various strata by packers or the introduction may be uncontrolled as brought out above to permit the portions entering the various layers to do so in amounts automatically controlled by the permeability of the layers. The emulsions thus produced may be of either oil-in-water type or of water-in-oil type. The production of one or the other, as desired, may be controlled by addition of emulsifying agents chosen to provide the type desired. Generally it is found most advantageous to produce water-in-oil type emulsions, and emulsions of this type are those which will generally result when the oxidized products are intimately admixed with water. A second alternative, involving the production of the oxidation products at the surface, may involve the introduction into the formation of the oxidized oil itself without previous emulsification with water. In such case the oxidized oil will distribute itself in the formations as previously described. Then, when water is introduced an emulsion will result due to the intimate contact of the two components as they pass through the fine pore spaces of the formations. In this case the emulsion formation will be of a progressive nature, there being involved not only the added water but water which is residual in the formations. The distribution will take place in accordance with the principles previously discussed, more emulsion being produced in the more permeable layers than in the less permeable layers from the standpoint of direction of flow.

Results of the type just described will also be produced if the oxidation is carried out in situ and this is followed by the introduction of water, the emulsion formation being again progressive in the direction of flow away from the injection region.

It may be noted that in the foregoing when reference is made to the introduction of water, this water may be merely the initial part of the water drive which ultimately advances the slug and effects the drive before it of the liquids in the reservoir. If a gas drive is to be used, water may be introduced only to the extent necessary to produce the desired emulsion slug.

Various other drive techniques may be used. For example, the emulsion slug may be followed by liquefied petroleum gas to provide a miscible slug preceding a gas drive which may in turn be followed by a water drive. The known advantages of use of a miscible slug will thus be achieved.

The effective viscosity of the slug of emulsion is not so much due to the actual viscosity of the continuous phase as to the so-called Jamin effect. The Jamin effect is due to the resistance to flow produced by the material forming the continuous phase which, in a sense, blocks the pores of the formation so that the slug material, viewed as a whole, has an apparent high viscosity exceeding that of the fluids in the reservoir. The viscosity may be further increased by actual increase of viscosity of the continuous phase. For example, the oil subjected to surface oxidation may have admixed with it either prior to or subsequent to oxidation high viscosity crude oil, still-bottoms, or olefin polymers. In similar fashion, if oxidation is produced in situ, there may be injected prior to oxidation viscous materals of the type just mentioned; or these may be introduced after oxidation, admixing with the emulsion as the initial portion of drive occurs. Thus, a wide range of viscosities may be made available for use in accordance with the results desired. What should be used will generally be determined by preliminary tests of flow conditions using samples of porous materials corresponding to those secured by coring of the formations. As is well known, deductions as to flow conditions may be made by taking into consideration previous history of the particular reservoir being operated. The deductions are made from pressure and flow measurements composition of produced fluids, etc. The engineers in charge of operations may thus make their best estimates as to the desired properties of a slug to be used for driving purposes.

It will be evident that numerous variations in procedure may be adopted depending upon conditions observed, and the invention is accordingly not to be considered as limited except as required by the following claim.

What is claimed is:

The secondary recovery method for petroleum-containing fluid from a reservoir containing said fluid in layered formations of varying permeabilities which includes:

introducing through at least one injection well into said reservoir an emulsion in preformed condition and comprising liquid continuous and discontinuous phases, one of said phases comprising as a major constituent oxidized petroleum oil having a low interfacial tension, the other phase being aqueous, to produce in the reservoir a slug in the form of such emulsion having a higher effective viscosity than the petroleum-containing fluid in the reservoir and varying in penetration into said formations; and then providing a fluid drive through said injection well to advance said slug to drive before it the petroleum-containing fluid to at least one producing well.

References Cited by the Examiner

UNITED STATES PATENTS

| | | | |
|---|---|---|---|
| 2,731,414 | 1/1956 | Binder et al. | 166—10 X |
| 2,875,831 | 3/1959 | Martin et al. | 166—9 |
| 2,988,142 | 6/1961 | Maly | 166—9 |
| 3,036,631 | 5/1962 | Holbrook | 166—9 |
| 3,072,185 | 1/1963 | Bond et al. | 166—11 |
| 3,149,669 | 9/1964 | Binder et al. | 166—9 |
| 3,174,542 | 3/1965 | Reisberg | 166—9 |
| 3,174,543 | 3/1965 | Sharp | 166—11 |

OTHER REFERENCES

Reed et al.: "Experimental Aspects of Reverse Combustion in Tar Sands," Journal of Petroleum Technology, May 1960, pp. 13 and 14.

CHARLES E. O'CONNELL, *Primary Examiner.*

S. J. NOVOSAD, *Assistant Examiner.*